US010795073B2

(12) United States Patent
Chen et al.

(10) Patent No.: US 10,795,073 B2
(45) Date of Patent: Oct. 6, 2020

(54) LIGHT GUIDE PLATE

(71) Applicant: Darwin Precisions Corporation, Hsinchu County (TW)

(72) Inventors: Yen-Lung Chen, Hsinchu County (TW); Hui-Ying Chiang, Hsinchu County (TW); Chien-Ming Chu, Hsinchu County (TW); Meng-Hui Chen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 16/786,236

(22) Filed: Feb. 10, 2020

(65) Prior Publication Data

US 2020/0271849 A1 Aug. 27, 2020

(30) Foreign Application Priority Data

Feb. 22, 2019 (TW) .............................. 108106117 A (51) Int. Cl.
*F21V 8/00* (2006.01)
*G02F 1/13357* (2006.01)

(52) U.S. Cl.
CPC ......... *G02B 6/0038* (2013.01); *G02B 6/0036* (2013.01); *G02F 1/133615* (2013.01)

(58) Field of Classification Search
CPC ............ G02F 1/133615; G02B 6/0036; G02B 6/0038
USPC ....................................................... 362/606
See application file for complete search history.

(56) References Cited

U.S. PATENT DOCUMENTS

| 6,746,129 B2 | 6/2004 | Ohkawa | |
|---|---|---|---|
| 6,834,973 B2 * | 12/2004 | Ohkawa | G02B 6/0021 362/23.16 |
| 7,364,341 B2 * | 4/2008 | Parker | G02B 6/0053 362/620 |

(Continued)

FOREIGN PATENT DOCUMENTS

| TW | I224688 B | 12/2004 |
|---|---|---|
| TW | 200705044 | 2/2007 |

(Continued)

*Primary Examiner* — Christopher M Raabe
(74) *Attorney, Agent, or Firm* — WPAT, PC (57) ABSTRACT

The present invention provides a light guide plate having a light exit surface, a light incident surface and a bottom surface. In the said light guide plate, the bottom surface is opposite to the light exit surface, and the light incident surface connects the light exit surface and the bottom surface. A plurality of light guide structures are formed on the bottom surface, and each of the light guide structure includes a front mound protruding above the bottom surface, a back mound protruding above the bottom surface and located at the side of the front mound opposite to the light incident surface, and a concave eye-shaped portion caved in from the bottom surface and located between the front mound and the back mound. The concave eye-shaped portion has a first slope surface connected with the front mound and a second slope surface connected with the back mound, wherein the first slope surface and the second slope surface are connected at the bottom of the concave eye-shaped portion so as to form an arc-shaped connection border junction.

18 Claims, 6 Drawing Sheets

(56) References Cited

U.S. PATENT DOCUMENTS

| | | | | |
|---|---|---|---|---|
| 7,507,011 B2* | 3/2009 | Ueno | ............... | G02B 6/0028 |
| | | | | 362/612 |
| 9,329,328 B2 | 5/2016 | Chen et al. | | |
| 2008/0198621 A1* | 8/2008 | Tanoue | ............... | G02B 6/0038 |
| | | | | 362/606 |
| 2010/0091520 A1* | 4/2010 | Liao | ............... | G02B 6/0036 |
| | | | | 362/616 |
| 2010/0110725 A1* | 5/2010 | Chang | ............... | G02B 6/0036 |
| | | | | 362/608 |
| 2011/0241573 A1* | 10/2011 | Tsai | ............... | G02B 6/0036 |
| | | | | 315/312 |
| 2016/0047967 A1* | 2/2016 | Kim | ............... | G02B 6/0036 |
| | | | | 362/606 |
| 2016/0047971 A1* | 2/2016 | Kim | ............... | G02B 6/0045 |
| | | | | 362/606 |
| 2017/0131455 A1* | 5/2017 | Asano | ............... | G02B 6/0036 |

FOREIGN PATENT DOCUMENTS

| | | |
|---|---|---|
| TW | 201035608 | 10/2010 |
| TW | 201344307 A | 11/2013 |
| TW | I522663 B | 2/2016 |
| TW | I528087 B | 4/2016 |

* cited by examiner

LIGHT GUIDE PLATE

BACKGROUND OF THE INVENTION

1. Field of the Invention

The present disclosure relates to a light guide plate. In particular, the present disclosure relates to a light guide plate having a light exit structure.

2. Description of the Prior Art

Backlight modules are widely used in various electric devices or display devices as backlight source. In order to enhance and improve light exit effect or optical properties, backlight modules may optionally include some optical components or optical films. Among the optical components or optical films, a light guide plate mainly used for conducting and distributing lights effectively to form a surface light source is an indispensable core component of the backlight modules, and properties of the light guide plate will determine the brightness and light exit effectiveness of the backlight modules.

As aforementioned, a plurality of optical micro structures are formed in some light guide plates in order to guide lights to exit from the light guide plates effectively. However, the current optical micro structures might also generate too much scattered light when guiding lights, hence it is still impossible for lights to be guided to exit according to the expected direction.

SUMMARY OF THE INVENTION

The Problem to be Solved

In order to solve the aforesaid problem, an embodiment of the present disclosure provides a light guide plate. The light guide plate includes a light exit surface, a light incident surface located at a side of the light exit surface, and a bottom surface opposite to the light exit surface. Wherein, the light incident surface connects the light exit surface and the bottom surface, and a plurality of light exit structures are formed on the bottom surface. Each of the light exit structure comprises a front mound protruding above the bottom surface, a back mound protruding from the bottom surface and located at the side of the front mound opposite to the light incident surface, and a concave eye-shaped portion caved in from the bottom surface and located between the front mound and the back mound. The concave eye-shaped portion has a first slope surface connected with the front mound and a second slope surface connected with the back mound, and the first slope surface and the second slope surface are connected at the bottom of the concave eye-shaped portion so as to form an arc-shaped junction.

The Effect Compared to Prior Arts

Using the light guide plate provided in the embodiments of the present disclosure, light exit effectiveness and/or brightness of guided light exiting from the light exit surface may be improved, and the light exit effectiveness or optical properties of devices having such light guide plates may be improved. In addition, due to the improvement of light guide effectiveness of the light guide plates, devices having these light guide plates may selectively omit or decrease the use of other optical components or optical films, and in turn further decrease production costs, thickness, and weight of these devices.

DETAILED DESCRIPTION OF THE PREFERRED EMBODIMENT

Each embodiments are described in the present specification, and people skilled in the art may easily understand the conception principles of the present invention with reference to description and FIGs. Here, each elements and portions in illustrated in FIGs may be amplified or modified for the purpose of clarification. Thus, it should be understood by people skilled in the art that sizes and relative proportion of components or portions in FIGs are not illustrated based on actual sizes and relative proportions. In addition, even though some specific embodiments are described in the contents, these embodiments are merely used as examples, and the contents shown in the following sentences never limit the scope of the present disclosure. Thus, without departing from the conception principles of the present invention, people skilled in the present art may easily realize the present disclosure through other embodiments based on different views and applications.

Figure 1:
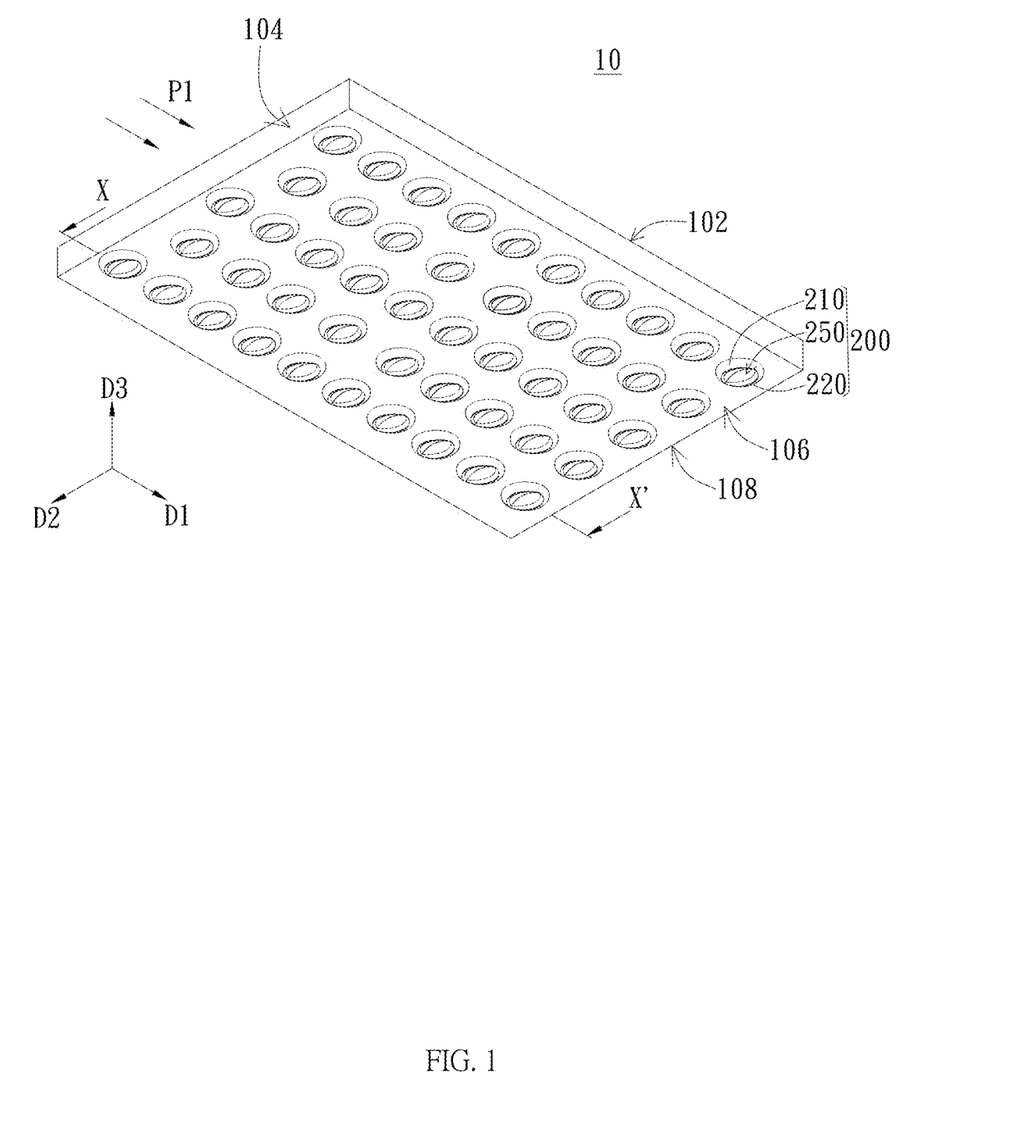
FIG. 1 is a diagram of a light guide plate in an embodiment of the present disclosure.

Please refer to FIG. 1 illustrating bottom view of the light guide plate 10 in an embodiment of the present disclosure. The light guide plate 10 includes: a light exit surface 102 to allow light (not illustrated) to exit by default; a light incident surface 104 located at one side of the light exit surface 102, configured to allow light P1 to enter the light guide plate; and a bottom surface 106 opposite to the light exit surface 102. Specially, the light exit surface 102 may be the top surface of the light guide plate 10 and opposite to the bottom surface 106; and the light incident surface 104, which is one of the side surfaces of the light guide plate 10, may connect the light exit surface 102 and the bottom surface 106, and be opposite to other side surface 108. Wherein, the direction from the light incident surface 104 toward the other side surface 108 may be defined as the first direction D1; the direction from the right end toward the left end of the light incident surface 104 and parallel to the bottom surface 106 in FIG. 1 may be defined as the second direction D2; and the direction from the bottom surface 106 toward the light exit surface 102 may be defined as the third direction D3.

Please continue to refer to FIG. 1. According to an embodiment of the present disclosure, a plurality of light exit structure 200 may be formed on the bottom surface 106 of the light guide plate 10. The light P1 incident from the light incident surface 104 may exit from the light exit surface 102 away from the bottom surface 106 through reflection by the plurality of light exit structure 200. Wherein, to achieve better guiding effect, the light exit structures 200 may be arranged uniformly or non-uniformly in various intervals on the bottom surface 106, and the present disclosure is not limited to the arrangement pattern illustrated in FIG. 1.

Figure 2A:
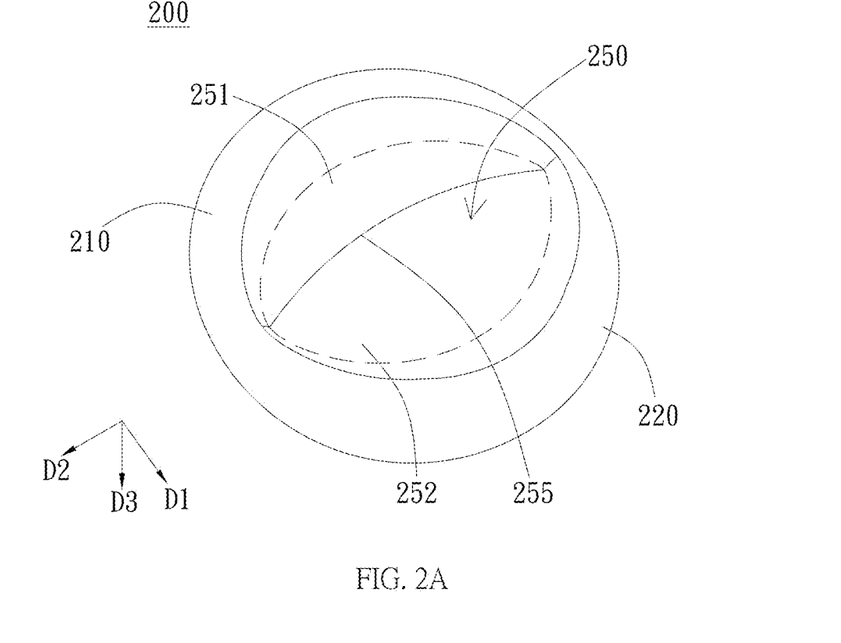
FIG. 2A is an enlarged diagram of a light exit structure in FIG. 1.
Figure 2B:
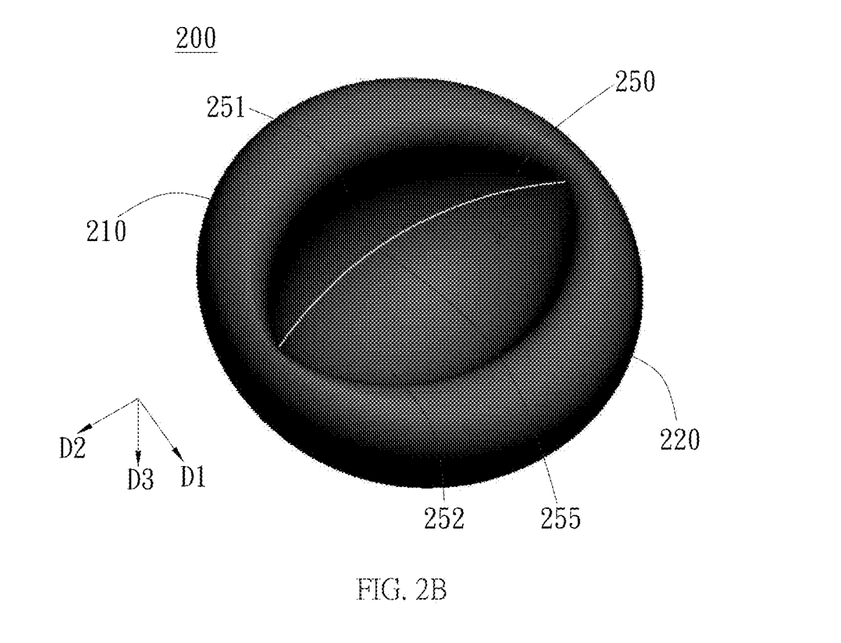
FIG. 2B is a computer 3D drawing of the light exit structure illustrated in FIG. 2A.

Please continue to refer to FIG. 1 with reference to FIG. 2A and FIG. 2B further describing the light exit structures 200 in FIG. 1. Wherein, FIG. 2A illustrates an enlarged diagram of the light exit structure of FIG. 1, and FIG. 2B illustrates a computer 3D drawing of the light exit structure in FIG. 2A.

Please refer to FIG. 2A and FIG. 2B. Each of the light exit structures 200 may include a front mound 210 protruding above the bottom surface 106 (that is, protruding from a virtual horizontal plane in which the bottom surface 106 lies away from the light exit surface 102), a back mound 220 protruding above the bottom surface 106 (that is, protruding from the virtual horizontal plane in which the bottom surface 106 lies away from the light exit surface 102), and a concave eye-shaped portion 250 caved in from the bottom surface 106 (that is, concaved from the virtual horizontal plane in which the bottom surface 106 lies toward the light exit surface 102) and located between the front mound 210 and the back mound 220. Wherein, dashed lines illustrated in FIG. 2A are respectively a border line between the concave eye-shaped portion 250 and the front mound 210 and a border line between the concave eye-shaped portion 250 and the back mound 220, and they may essentially form a connection on a smooth surface without border lines therebetween.

Specially, the light exit structures 200 may generally appear to be a round or a close-to-round shape, and has a half football-shaped concave eye portion 250 surrounded by the front mound 210 and the back mound 220. Preferably, the aforementioned shape is the shape of the structure vertically projected on the virtual horizontal plane in which the bottom surface 106 lies. As mentioned above, both the front mound 210 and the back mound 220 protrude from the bottom surface 106 away from the light exit surface 102, and the concave eye-shaped portion 250 is caved in from the bottom surface 106 toward the light exit surface 102. Based on the concave eye-shaped portion 250, the front mound 210 is relatively close to the light incident surface 104, and the back mound 220 is relatively away from the light incident surface 104. That is, the back mound 220 is located at the side of the front mound 210 opposite to the light incident surface 104. Then, the front mound 210 relatively close to the light incident surface 104 is configured to form an arc-shaped distribution convex toward the light incident surface 104, and the back mound 220 relatively opposite to the light incident surface 104 may form an arc-shaped distribution opposite to the front mound 210. Through this structure, two ends along the extending directions of the front mound 210 are respectively connected with two ends along the extending directions of the back mound 220 so as to together surround the concave eye-shaped portion 250 to form a pattern similar to a plant's half moon-shaped guard cells surrounding a central stomatal. In addition, preferably, the height of a connection location of the front mound 210 and the back mound 220 relative to the bottom surface 106 is smaller than the height of the top of the front mound 210 or the back mound 220. The top of the front mound 210 or the back mound 220 is preferably formed in the middle of the two ends of the extending directions.

Then, please refer to FIG. 2A and FIG. 2B. The caved concave eye-shaped portion 250 has two slopes, wherein a first slope surface 251 is connected with the front mound 210 and the second slope surface 252 is connected with the back mound 220. That is, the first slope surface 251 caves into the bottom surface 106 from the edge of the front mound 210, and the second slope surface 252 caves into the bottom surface 106 from the edge of the back mound 220. However, the first slope surface 251 and the second slope surface 252, which cave, are connected again at the bottom of the concave eye-shaped portion 250 so as to form an arc-shaped junction 255.

Here, according to some embodiments of the present disclosure, as shown in FIG. 1 to FIG. 2B, the junction 255 may be convex toward the light incident surface 104. That is, two ends of the arc-shaped junction 255 are relatively away from the light incident surface 104, and the middle of the arc-shaped junction 255 is relatively close to the light incident surface 104. In that case, the distance between the top end of the junction 255 convex toward the light incident surface 104 and the edge of the front mound 210 is preferably smaller than the distance between the top end and the edge of the back mound 220; however, the present disclosure is not limited thereto. In addition, the arc-shaped junction 255 may have the same or different radius of curvature at different locations, and the maximum radius of curvature preferably ranges from 150 μm to 250 μm. For example, according to a preferred embodiment of the present disclosure, the maximum radius of curvature of the junction 255 may be 168 μm.

Figure 3:
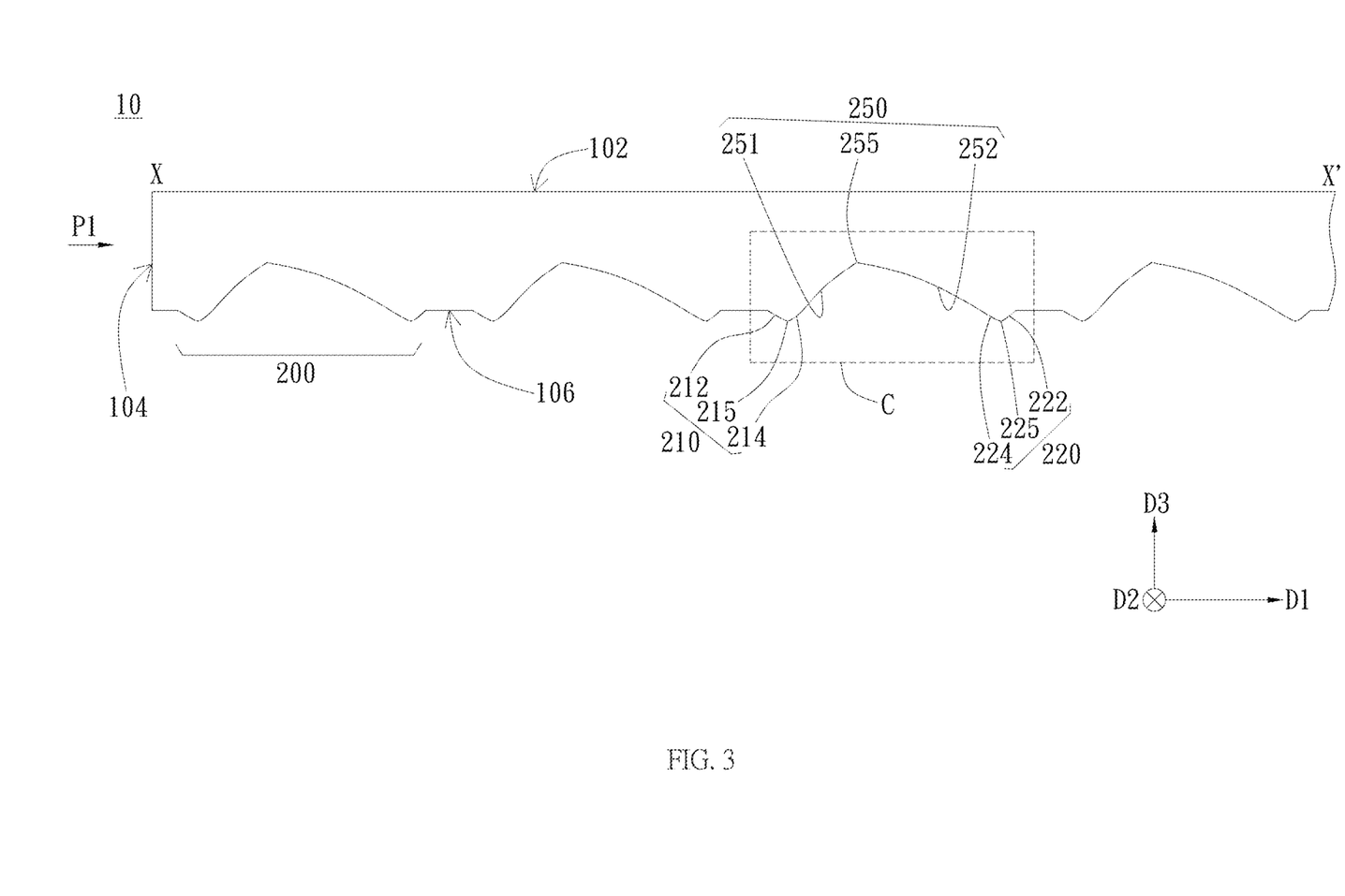
FIG. 3 is a sectional drawing of the light guide plate cut along the line X-X' in FIG. 1.
Figure 4:
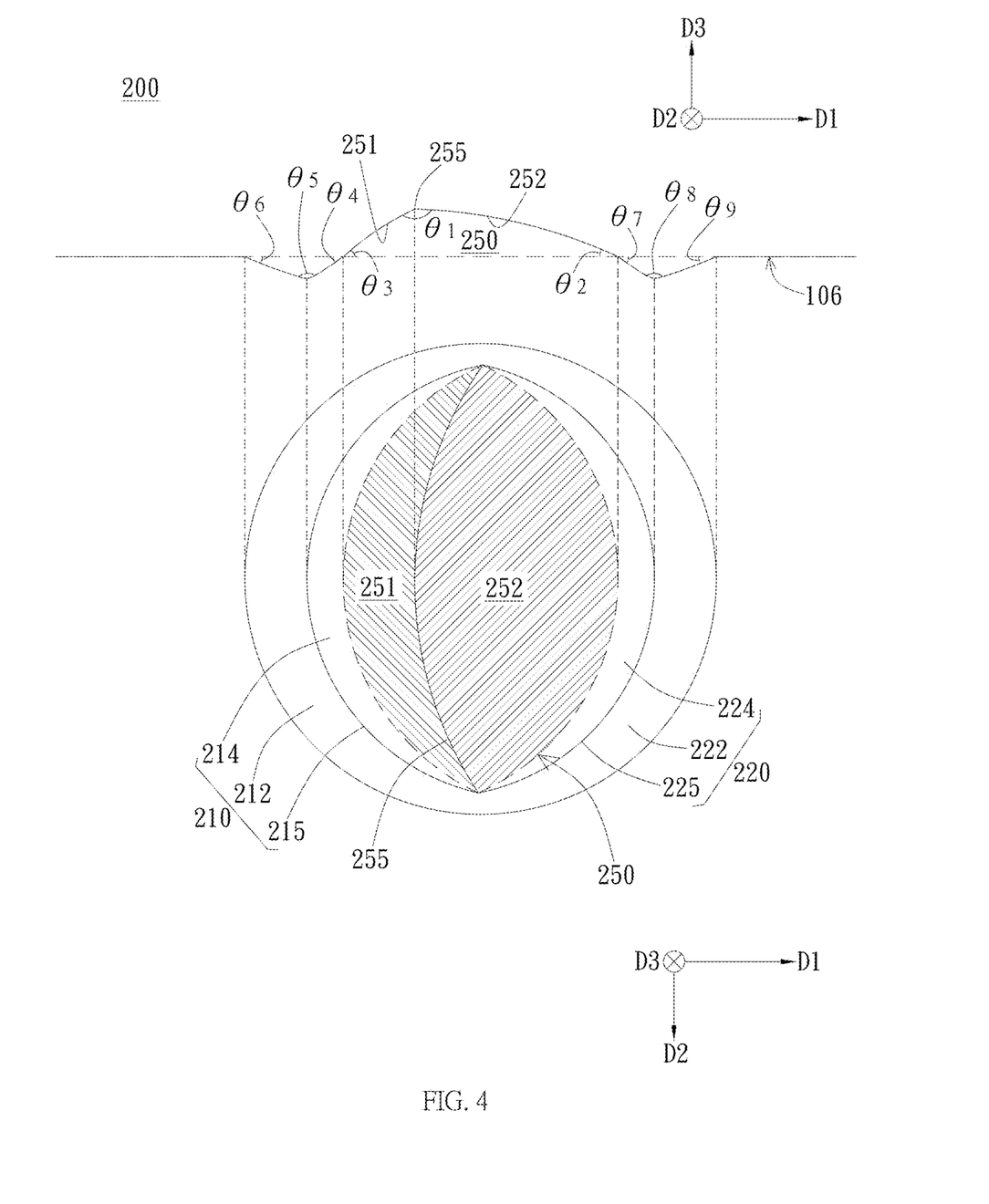
FIG. 4 and FIG. 5 are enlarged diagrams of a portion C of the light exit structure in FIG. 3.
Figure 5:
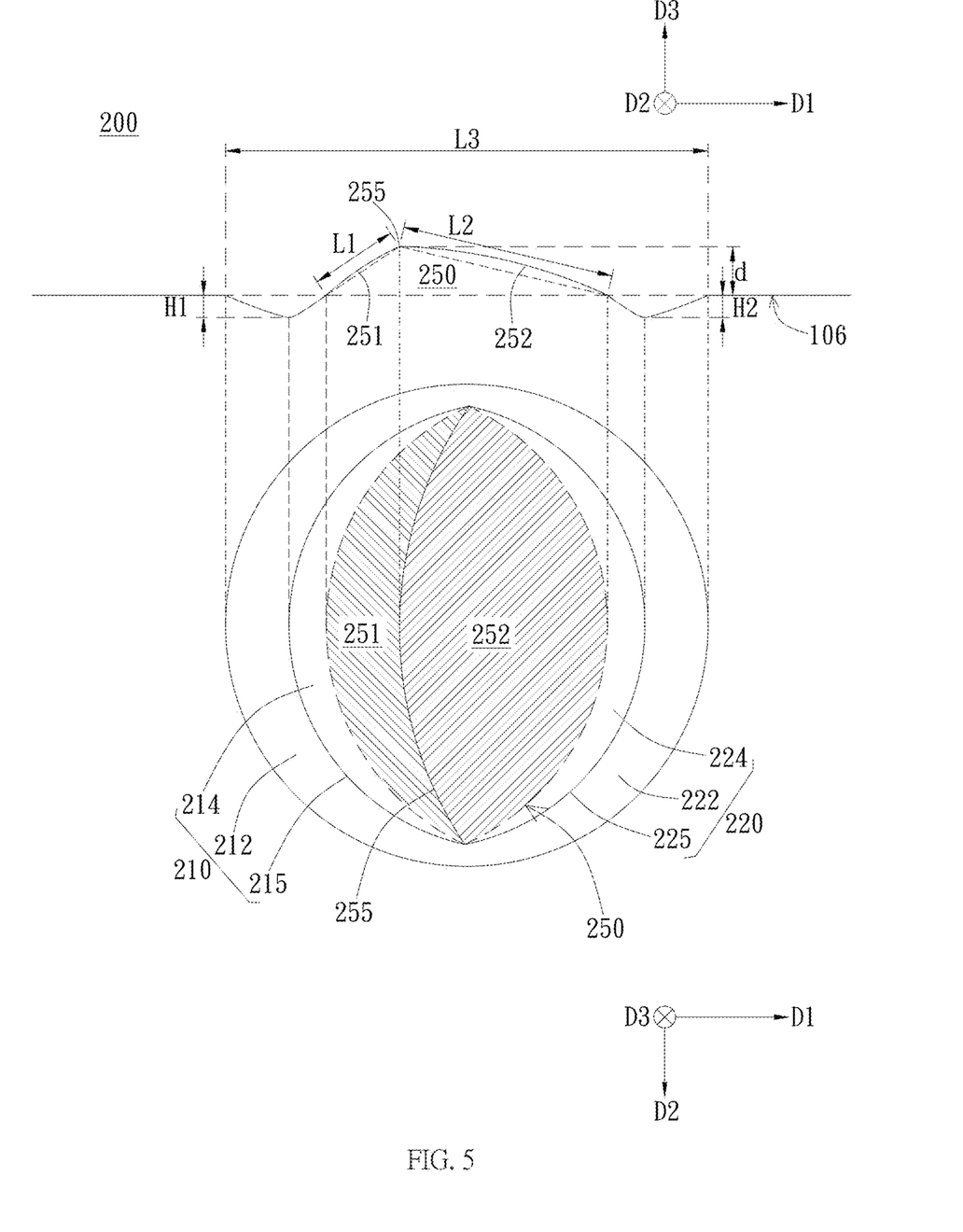
Figure 6:
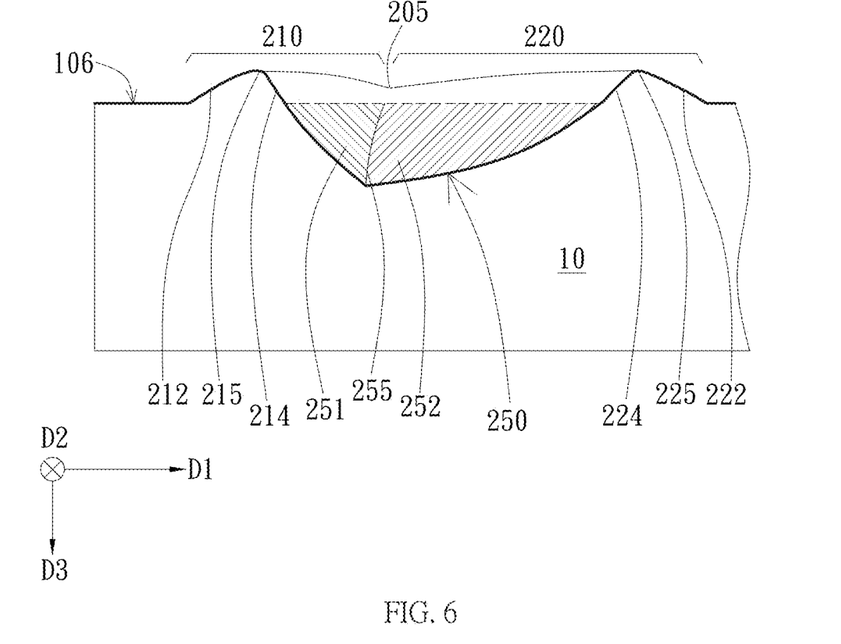
FIG. 6 is an enlarged oblique drawing of a portion C of the light guide structure in FIG. 3; wherein the orientation of FIG. 6 is upside down from the orientation illustrated in FIG. 4 and FIG. 5 for the convenience of description.

In the following sentences, the light exit structures 200 in an embodiment of the present disclosure is further described in detail with reference to FIG. 3 to FIG. 6. Specially, FIG. 3 is a sectional drawing of the light guide plate cut along the line X-X' in FIG. 1; FIG. 4 and FIG. 5 are enlarged diagrams of the portion C of the light exit structure in FIG. 3; and FIG. 6 is an enlarged oblique drawing of the portion C of the light guide structure in FIG. 3, wherein the orientation of FIG. 6 is upside down from the orientation illustrated in FIG. 4 and FIG. 5 for convenience of description.

Thus, please refer to FIG. 3 and FIG. 4 together. In the light exit structures 200, the front mound 210 has a front mound outer slope surface 212 located at the side near the light incident surface 104, the front mound inner slope surface 214 opposite to the front mound outer slope surface 212, and a front mound top 215 connecting the front mound outer slope surface 212 and the front mound inner slope surface 214. Preferably, the front mound top 215 is the ridge of the front mound 210 or the top of the round corner formed by connecting the front mound outer slope surface 212 and the front mound inner slope surface 214, and the heights of the front mound outer slope surface 212 and the front mound inner slope surface 214 are respectively and gradually decreased from the front mound top 215 to two ends of the front mound top 215 so as to form the front mound 210.

On the other hand, in the light exit structures 200, the back mound 220 has a back mound inner slope surface 224 located at the side near the light incident surface 104, a back mound outer slope surface 222 opposite to the back mound inner slope surface 224, and a back mound top 225 connecting the back mound outer slope surface 222 and the back mound inner slope surface 224. Preferably, the back mound top 225 is the ridge of the back mound 220 or the top of the round corner formed by connecting the back mound outer slope surface 222 and the back mound inner slope surface 224, and the heights of the back mound outer slope surface 222 and the back mound inner slope surface 224 are respectively and gradually decreased from the back mound top 225 to two ends of the back mound top 225 so as to form the back mound 220.

As in the aforementioned structure, the front mound inner slope surface 214 may be connected (interacted) with the first slope surface 251 of the concave eye shaped portion 250, and the back mound inner slope surface 224 may be connected (joined) with the second slope surface 252 of the concave eye-shaped portion 250. Here, the front mound inner slope surface 214 and the first slope surface 251 essentially form a connection in a smooth surface without border lines therebetween, wherein the front mound inner slope surface 214 is defined as the slope protruding from the bottom surface 106, and the first slope surface 251 is defined as the slope caved in from the bottom surface 106 (dash lines at the lower side of FIG. 4 represents the slope caved in from the bottom surface 106). Similarly, the back mound inner slope surface 224 and the second slope surface 252 essentially form a connection in a smooth surface without border lines therebetween, wherein the back mound inner slope surface 224 is defined as the slope protruding from the bottom surface 106, and the second slope surface 252 is defined as the slope caved in from the bottom surface 106 (dash lines at the lower side of FIG. 4 represents the slope caved in from the bottom surface 106).

According to some embodiments of the present disclosure, each of the front mound outer slope surface 212 and the front mound inner slope surface 214 may be a convex surface, and/or each of the back mound outer slope surface 222 and the back mound inner slope surface 224 may be formed as a convex surface. On the other hand, at least one of the first slope surface 251 and the second slope surface 252 of the concave eye-shaped portion 250 may be a concave surface. Therefore, the junction between the front mound inner slope surface 214 and the first slope surface 251 may be a junction between a convex surface and a concave surface, and the junction between the back mound inner slope surface 224 and the second slope surface 252 may be a junction between a convex surface and a concave surface. However, the aforementioned embodiments are merely examples, and the present disclosure is not limited thereto.

Specifically, please refer to FIG. 4. According to some embodiments of the present disclosure, the included angle θ1 between the first slope surface 251 and the second slope surface 252 of the concave eye-shaped portion 250 at the junction 255 may range from 30 degrees to 150 degrees. According to a preferred embodiment, the included angle θ1 between the first slope surface 251 and the second slope surface 252 of the concave eye-shaped portion 250 may be 130 degrees. In addition, an included angle θ3 between the first slope surface 251 of the concave eye-shaped portion 250 and the bottom surface 106 at a horizontal plane in which the bottom surface 106 lies may range from 10 degrees to 90 degrees. Similarly, an included angle θ2 between the second slope surface 252 and the bottom surface 106 at the horizontal plane in which the bottom surface 106 lies may also range from 10 degrees to 90 degrees. However, according to some preferred embodiments, the included angle θ3 between the first slope surface 251 and the bottom surface 106 may be larger than the included angle θ2 between the second slope surface 252 and the bottom surface 106. That is, the included angle θ3 between the concave slope surface of the side of the concave eye-shaped portion 250 relatively close to the light incident surface 104 and the horizontal plane in which the bottom surface 106 lies may be larger than the included angle θ2 between the concave surface of the side relatively away from the light incident surface 104 and the horizontal plane in which the bottom surface 106 lies. For example, according to a preferred embodiment, the included angle θ3 may be 35 degrees, and the included angle θ2 may be 15 degrees. Therefore, the junction 255 may be relatively close to the light incident surface 104 in the concave eye-shaped portion 250.

Furthermore, as mentioned above, the front mound 210 may have the front mound top 215, and the back mound 220 may have the back mound top 225. Wherein (please refer to FIG. 4) the included angle θ5 between the front mound outer slope surface 212 and the front mound inner slope surface 214 at the location of the front mound top 215 may range from 10 degrees to 170 degrees. That is, using the location of the front mound top 215 as the cut point, the included angle θ5 between the front mound outer slope surface 212 and the front mound inner slope surface 214 at the location of the front mound top 215 may range from 10 degrees to 170 degrees. Wherein, according to a preferred embodiment, the included angle θ5 may be 157 degrees. In addition, each of the included angle θ6 between the front mound outer slope surface 212 and the bottom surface 106 and the included angle θ4 between the front mound inner slope surface 214 and an extension surface of the bottom surface 106 may range from 10 degrees to 90 degrees. Furthermore, according to some preferred embodiments of the present disclosure, the included angle θ6 between the front mound outer slope surface 212 and the bottom surface 106 may be larger than the included angle θ4 between the front mound inner slope surface 214 and the extension surface of the bottom surface 106. For example, the included angle θ6 between the front mound outer slope surface 212 and the bottom surface 106 may be 21 degrees, and the included angle θ4 between the front mound inner slope surface 214 and the extension surface of the bottom surface 106 may be 2 degrees. However, in different embodiments, the included angle θ6 may be smaller than or equal to the included angle θ4, and the present disclosure is not limited thereto.

Similar to the above, on the other hand, an included angle θ8 between the back mound outer slope surface 222 and the back mound inner slope surface 224 at the location of the back mound top 225 may range from 10 degrees to 170 degrees. That is, using the location of the back mound top 225 as the cut point, the included angle θ8 between the back mound outer slope surface 222 and the back mound inner slope surface 224 at the location of the back mound top 225 may range from 10 degrees to 170 degrees. Wherein, according to a preferred embodiment, the included angle θ8 may be 157 degrees. In addition, each of the included angle θ9 between the back mound outer slope surface 222 and the bottom surface 106 and the included angle θ7 between the back mound inner slope surface 224 and the extension surface of the bottom surface 106 may range from 10 degrees to 90 degrees. Furthermore, according to some preferred embodiments of the present disclosure, the included angle θ9 between the back mound outer slope surface 222 and the bottom surface 106 may be larger than the included angle θ7 between the back mound inner slope surface 224 and the extension surface of the bottom surface 106. For example, the included angle θ9 between the back mound outer slope surface 222 and the bottom surface 106 may be 21 degrees, and the included angle θ7 between the back mound inner slope surface 224 and the extension surface of the bottom surface 106 may be 2 degrees. However, in different embodiments, the included angle θ9 may be smaller than or equal to the included angle θ7, and the present disclosure is not limited thereto.

In addition, according to some embodiments of the present disclosure, the front mound 210 and the back mound 220 may be symmetrical with respect to the concave eye-shaped portion 250. That is, the included angle θ4 may equal to the included angle θ7; the included angle θ5 may equal to the included angle θ8; and the included angle θ6 may equal to the included angle θ9. However, the present disclosure is not limited thereto.

As mentioned above, the first slope surface 251 and the second slope surface 252 may be concave surfaces; the front mound outer slope surface 212 and the front mound inner slope surface 214 may be convex surfaces; and the back mound outer slope surface 222 and the back mound inner slope surface 224 may be convex surfaces. Therefore, the sum of the included angles 81, 82, and 83 may equal to or be larger than 180 degrees; the sum of the included angles 84, 85, and 86 may equal to or be larger than 180 degrees; and the sum of the included angles 87, 88, and 89 may equal to or be larger than 180 degrees.

Next, FIG. 5 further describes the dimensions and scales of each part of the light exit structures 200 illustrated in FIG. 4.

Next, please refer to FIG. 5. As shown in FIG. 1 to FIG. 2B, the junction 255 of the concave eye-shaped portion 250 may be convex toward the light incident surface 104, and therefore, a distance L1 between the top end of the junction 255 convex toward the light incident surface 104 and the edge of the front mound 210 may be smaller than the distance L2 between the top end and the back mound 220. Therefore, the area of the first slope surface 251 of the concave eye-shaped portion 250 may be smaller than the area of the second slope surface 252 of the concave eye-shaped portion 250.

In addition, according to an embodiment of the present disclosure, the longitudinal direction of the concave eye-shaped portion 250 of the light exit structures 200 is preferably perpendicular to the first direction D1. In other words, the longitudinal extension direction of the concave eye-shaped portion 250 of the light exit structures 200 may be perpendicular to the light incident direction D1. In this configuration, the length L3 of the light exit structures 200 cut out along the first direction D1 and perpendicular to the longitudinal direction D2 of the concave eye-shaped portion 250 may range from 1 μm to 300 μm. For example, according to a preferred embodiment, the length L3 may be 140 μm. That is, the light exit structures 200 may include a periphery of an approximate circle or an approximate ellipse surrounded together by the front mound 210 and the back mound 220, and the diameter of the approximate circle or the approximate ellipse along the first direction D1 may range from 1 μm to 300 μm, preferably 140 μm.

Furthermore, please continue to refer to FIG. 5. According to an embodiment of the present disclosure, the depth d of the concave eye-shaped portion 250 caved in from the bottom surface 106 may range from 1 μm to 30 μm. For example, according to a preferred embodiment of the present disclosure, the depth d of the concave eye-shaped portion 250 may be 7 μm. That is, the depth d from the extended horizontal plane of the bottom surface 106 to the junction 255 may range from 1 μm to 30 μm, preferably 7 μm. However, in the concave eye-shaped portion 250, the depth d may be different at different locations in the junction 255. Specially, according to an embodiment of the present disclosure, two ends of the junction 255 may have a depth d smaller than the depth d at the center of the junction 255.

That is, the junction 255 may have the maximum depth d at the center of itself, and the maximum depth d is preferably 7 μm. Thus, the concave eye-shaped portion 250 may be formed as a half football-liked shape.

On the other hand, according to some embodiments of the present disclosure, the height H1 of the front mound 210 protruding from the bottom surface 106 and the height H2 of the back mound 220 protruding from the bottom surface 106 may range from 1 μm to 50 μm. According to a preferred embodiment of the present disclosure, the height H1 of the front mound 210, and the height H2 of the back mound 220 may be 3 μm. That is, the height H1 from the extension horizontal plane of the bottom surface 106 to the front mound top 215 and the height H2 of the extension horizontal plane of the bottom surface 106 to the back mound top 225 may range from 1 μm to 50 μm, preferably 3 μm.

Next, please refer to FIG. 5 and FIG. 6 at the same time. The front mound 210 and the back mound 220 respectively extending to form half moon-shaped meanders may have different heights along the extending direction. For example, heights of the front mound 210 and the back mound 220 may respectively decreased toward the two ends of their extending directions. Therefore, the heights of the locations 205 connecting the two ends of the front mound 210 and the back mound 220 relative to the bottom surface 106 may be respectively smaller than the average height of the front mound 210 or the back mound 220 relative to the bottom surface 106, and the aforementioned preferred height may be the highest point of the front mound 210 or the back mound 220 relative to the bottom surface 106. In addition, horizontal dashed lines illustrated in FIG. 6 are junctions of the concave eye-shaped portion 250 with the front mound 210 and the back mound 220 respectively, and the junctions may essentially be formed as smooth surfaces without border lines therebetween.

As mentioned above, the light guide plate 10, provided according to each embodiments of the present disclosure, may concentrate the light of the light guide plate 10 exiting from the light exit surface 102 upon a normal. Thus, an angle that enables the brightness of the light exiting from the light exit surface 102 to be the highest may be close to zero degree. For example, according to an embodiment of the present disclosure, when the length L3 is close to 140 μm, the included angle θ1 is close to 130 degrees, the included angle θ2 is close to 15 degrees, the included angle θ3 is close to 35 degrees, the depth d of the concave eye-shaped portion 250 is close to 7 μm, the included angle θ4 is close to 2 degrees, the included angle θ5 is close to 157 degrees, the included angle 86 is close to 21 degrees, the height H1 is close to 3 μm, the included angle θ7 is close to 2 degrees, the included angle θ8 is close to 157 degrees, the included angle θ9 is close to 21 degrees, and the height H2 is close to 3 μm, the normal of the light exit surface 102 based on the light guide plate 10 is zero degree, and the angle that enables brightness of the light guide plate 10 to be the highest may be lower than 25 degrees. Furthermore, if using the light guide plate 10 with other optical components or optical films, such as Brightness Enhancement Film (BEF), the angle that enables the brightness to be highest may be close to zero degree.

The aforementioned included angles, lengths, depths, and heights merely are examples, and each of the included angles, lengths, depths, heights, and the like may be any values satisfying ranges defined by the aforementioned embodiments. For example, the length L3 may be determined at first, and the preferable depth d, the preferable height H1 and H2, and the preferable included angles 81 to 89 may be sequentially determined. That is, in the ranges defined in the aforementioned contents, the light guide plate in each embodiment of the present disclosure may improve brightness along an expected exit direction so as to achieve preferred light exit effectiveness.

The light exit structures 200 of the light guide plate 10 according to each embodiment of the present disclosure, may be preferably produced by thermoforming; however this is merely an example, and the light guide plate 10 and the light exit structures 200 of itself may be produced by various conventional methods or technologies developed in the future. For example, the light exit structures 200 may also be formed by laser, printing, UV, and the like.

Furthermore, the light guide plate 10 according to the embodiment of the present disclosure may be applied in various devices. For example, the light guide plate 10 having the light exit structures 200 illustrated in FIG. 1 to FIG. 6 may be applied in a backlight module of a display device. Specifically, according to an embodiment (please refer to FIG. 7), a display device 1000 may have a frame 2, a backlight module 400, and a display panel 500, which are sequentially stacked. Specifically, the backlight module 400 may include a reflective film 5, the light guide plate 10 according to each embodiment of the present disclosure, a lower diffuser film 20, a Brightness Enhancement Film (BEF), and an upper diffuser film 40 (or a Dual Brightness Enhancement Film (DBEF)). Wherein, at least one light source 1 (may be a portion of the components of the backlight module 400 or from another device) may emit the light P1 and enable it to be incident on the light incident surface 104 of the light guide plate 10. Thus, as mentioned above, according to an embodiment of the present disclosure, the direction D1 enabling the light P1 to be incident is preferably perpendicular to the longitudinal direction or the long diameter of the concave eye-shaped portion (not illustrated in FIG. 7) of the light exit structures 200. In addition, as mentioned above, the plurality of the light exit structures 200 may be parallel to the bottom surface 106 of the light guide plate 10 and disposed to form each type of patterns. Thus, the light P1 incident on the light guide plate 10 may be guided through the light exit structures 200, so as to concentrate the exit light P2 upon the direction D3 close to the normal N of the light exit surface 102.

Figure 7:
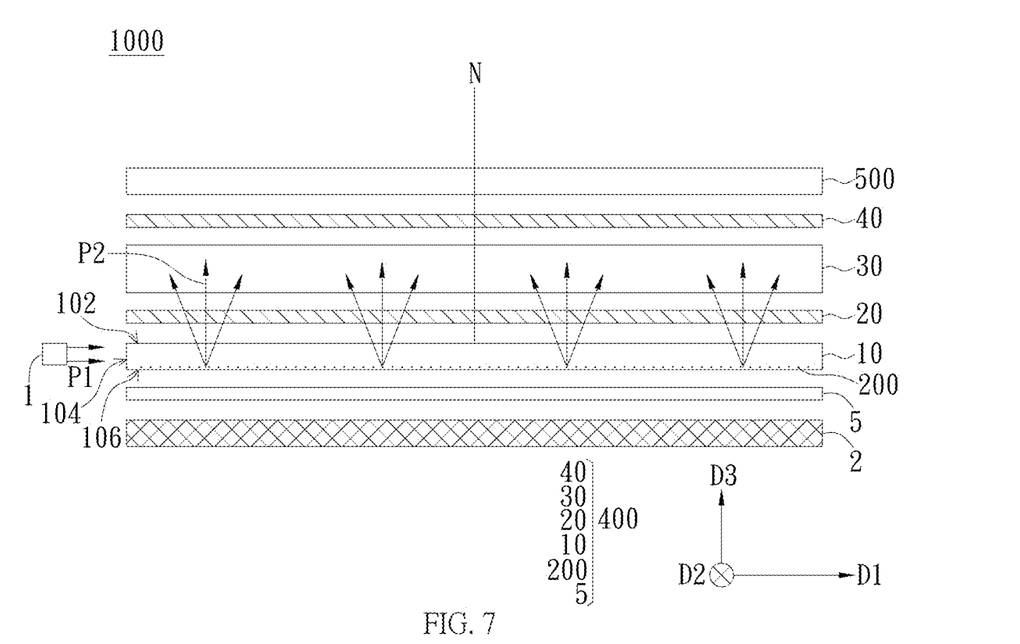
FIG. 7 is a diagram of a display device including the light guide plate in an embodiment of the present disclosure.

However, the backlight module 400 of the display device 1000 described with reference to FIG. 7 is merely an example, and the present disclosure is not limited thereto. For example, due to improvement of the light exit effectiveness and/or brightness by including the light guide plate 10 in each embodiments of the present disclosure, the backlight module 400 may also decrease or save a portion of the optical components or optical films so as to further decrease manufacturing cost, weights, or thickness of devices. In addition, the light guide plate 10 in each embodiment of the present disclosure may be applied in other devices or modules, and the display device 1000 described herein is merely one of the examples. Then, including the light guide plate 10 in each embodiment of the present disclosure, the light exit structures 200 may prevent the light being reflected completely so as to further concentrate the light from the light source in conduction devices or modules upon the light exit surface 102 effectively, and satisfy required brightness, illumination direction and light exit effectiveness.

The aforementioned descriptions merely represent some preferred embodiments of the present disclosure. It should be noted that the present disclosure may be altered and modified without departing from the conception principles of the present invention. People skilled in the art should understand that the scope of the present disclosure is defined by claims, and various equivalent changes such as replacement, combination, modifications, and conversion are all consequently viewed as being embraced by the scope of the present disclosure defined by claims with intension of the present disclosure.

What is claimed is:

1. A light guide plate, comprising:
   a light exit surface;
   a light incident surface located at a side of the light exit surface; and
   a bottom surface opposite to the light exit surface, the light incident surface connecting the light exit surface and the bottom surface; wherein a plurality of light exit structures are formed on the bottom surface, and each of the light exit structures comprises:
   a front mound protruding above the bottom surface;
   a back mound protruding above the bottom surface and located at a side of the front mound opposite to the light incident surface; and
   a concave eye shaped portion caved in from the bottom surface and located between the front mound and the back mound, wherein the concave eye shaped portion has a first slope surface connected with the front mound and a second slope surface connected with the back mound; the first slope surface and the second slope surface are connected at bottom of the concave eye shaped portion so as to form an arc-shaped junction.

2. The light guide plate according to claim 1, wherein the arc-shaped junction is convex toward the light incident surface.

3. The light guide plate according to claim 2, wherein a distance between a top end of the arc-shaped junction convex toward the light incident surface and the front mound is smaller than a distance between the top end and the back mound.

4. The light guide plate according to claim 1, wherein the maximum radius of curvature of the arc-shaped junction ranges from 150 µm to 250 µm.

5. The light guide plate according to claim 1, wherein at least one of the first slope surface and the second slope surface is a concave surface.

6. The light guide plate according to claim 1, wherein the front mound has a front mound outer slope surface located at a side near the light incident surface and a front mound inner slope surface opposite to the front mound outer slope surface, and the front mound inner slope surface and the first slope surface are connected.

7. The light guide plate according to claim 6, wherein each of the front mound outer slope surface and the front mound inner slope surface is a convex surface.

8. The light guide plate according to claim 6, wherein the front mound further has a front mound top, and an included angle between the front mound outer slope surface and the front mound inner slope surface at the front mound top ranges from 10 degrees to 170 degrees.

9. The light guide plate according to claim 6, wherein an included angle between the front mound outer slope surface and the bottom surface is smaller than an included angle between the front mound inner slope surface and an extension surface of the bottom surface.

10. The light guide plate according to claim 1, wherein the back mound has a back mound inner slope surface located at a side near the light incident surface and a back mound outer slope surface opposite to the back mound inner slope surface, and the back mound inner slope surface and the second slope surface are connected.

11. The light guide plate according to claim 10, wherein each of the back mound outer slope surface and the back mound inner slope surface is formed as a convex surface.

12. The light guide plate according to claim 10, wherein the back mound further has a back mound top, and an included angle between the back mound outer slope surface and the back mound inner slope surface at the back mound top ranges from 10 degrees to 170 degrees.

13. The light guide plate according to claim 10, wherein an included angle between the back mound outer slope surface and the bottom surface is smaller than an included angle between the back mound inner slope surface and an extension surface of the bottom surface.

14. The light guide plate according to claim 1, wherein an area of the first slope surface is smaller than an area of the second slope surface.

15. The light guide plate according to claim 1, wherein an included angle between the first slope surface and the bottom surface at a horizontal plane in which the bottom surface lies is larger than an included angle between the second slope surface and the bottom surface at the horizontal plane in which the bottom surface lies.

16. The light guide plate according to claim 1, wherein the front mound forms an arc-shaped distribution convex toward the light incident surface, and the back mound forms an arc-shaped distribution opposite to the front mound.

17. The light guide plate according to claim 16, wherein two ends along an extending direction of the front mound are respectively connected with two ends along an extending direction of the back mound so as together to surround the concave eye shaped portion.

18. The light guide plate according to claim 17, wherein a height of a connection location of the front mound and the back mound relative to the bottom surface is smaller than an average height of the front mound or the back mound relative to the bottom surface.

* * * * *